United States Patent
Lugt et al.

(10) Patent No.: US 7,275,319 B2
(45) Date of Patent: Oct. 2, 2007

(54) ROLLING ELEMENT BEARING HAVING STARVED LUBRICATION CONDITIONS

(75) Inventors: Pieter Martin Lugt, Vianen (NL); Eusthatios Ioannides, Zeist (NL); Ingrid Victoria Wikstrom, Gunnilse (SE); John Howard Tripp, Bilthoven (NL); Marie-Laure Dumont, Ijsselstein (NL); Antonio Gabelli, Ijsselstein (NL); Benoit Clement Jacod, Nieuwegein (NL)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 11/256,104

(22) Filed: Oct. 24, 2005

(65) Prior Publication Data

US 2006/0037196 A1 Feb. 23, 2006

Related U.S. Application Data

(63) Continuation of application No. 10/297,832, filed as application No. PCT/NL01/00443 on Jun. 12, 2001.

(30) Foreign Application Priority Data

Jun. 14, 2000 (NL) .................................. 1015429

(51) Int. Cl.
*B21D 53/10* (2006.01)
*B21K 1/76* (2006.01)
*B21P 6/00* (2006.01)
*F16C 19/00* (2006.01)
*F16C 33/32* (2006.01)
*F16C 33/62* (2006.01)
*F16C 41/00* (2006.01)
*F16C 33/00* (2006.01)

(52) U.S. Cl. ................ 29/898.1; 29/898.02; 29/898.06; 29/898.013; 384/462; 384/491; 384/492; 384/624; 384/625

(58) Field of Classification Search ............. 29/898.02, 29/898.06, 898.13, 898.1; 384/565, 569, 384/625, 491, 462, 492, 624
See application file for complete search history.

(56) References Cited

U.S. PATENT DOCUMENTS 4,893,387 A * 1/1990 Akamatsu et al. ............ 492/37

(Continued)

FOREIGN PATENT DOCUMENTS

JP A 9-196070 7/1997

(Continued)

*Primary Examiner*—David P. Bryant
*Assistant Examiner*—Alexander P Taousakis
(74) *Attorney, Agent, or Firm*—Oliff & Berridge, PLC

(57) ABSTRACT

A rolling element bearing comprises an inner ring and an outer ring which are each provided with a raceway, and a series of rolling elements which are in contact with the raceways of each ring. A lubricant film is provided in the contacts between the rolling elements and the raceways, which film forms a lubricant meniscus at the inlet side of each contact. In the bearing starved lubrication conditions prevail. The surface of each rolling element has minute recesses filled with a lubricant quantity, said recesses being flattened in the contact area defined by the contact between the rolling elements and the rings and thereby releasing lubricant at the inlet side of each contact resulting in a displacement of the meniscus further away from said contact. This meniscus displacement results in an increased lubricant film thickness in each contact area, thus improving the lubricating conditions in the bearing.

11 Claims, 4 Drawing Sheets

U.S. PATENT DOCUMENTS

| | | | |
|---|---|---|---|
| 4,916,751 A * | 4/1990 | Sumita et al. | 384/516 |
| 5,284,394 A * | 2/1994 | Lemelson | 384/463 |
| 5,397,188 A * | 3/1995 | Yoshizuka et al. | 384/492 |
| 5,498,086 A * | 3/1996 | Ou | 384/491 |
| 5,642,947 A | 7/1997 | Akamatsu et al. | |
| 5,967,672 A * | 10/1999 | Akamatsu et al. | 384/516 |
| 6,340,245 B1 * | 1/2002 | Horton et al. | 384/492 |
| 6,371,656 B1 * | 4/2002 | De Vries et al. | 384/565 |

FOREIGN PATENT DOCUMENTS

| | | |
|---|---|---|
| JP | A 10-110733 | 4/1998 |
| JP | A 2000-205284 | 7/2000 |
| NL | 1 000 027 C | 10/1996 |
| WO | WO99/13235 | 3/1999 |

* cited by examiner

ROLLING ELEMENT BEARING HAVING STARVED LUBRICATION CONDITIONS

This is a Continuation of application Ser. No. 10/297,832 filed Dec. 11, 2002, which in turn is a National Stage Application of PCT/NL01/00443 filed Jun. 12, 2001. The entire disclosure of the prior applications is hereby incorporated by reference herein in its entirety.

BACKGROUND

The invention is related to a rolling element bearing which operates under starved lubrication conditions. In such cases, not enough lubricant is available in the inlet side of the contact for entrainment such that a lubricant film of sufficient thickness in the contact areas defined by the contacts between the rolling elements and the rings is formed. In normal operating conditions the film thickness between rings and rolling elements is determined by the geometry of the contacts, the lubricant properties, such as viscosity, and the entraining velocity. In starved lubrication conditions, the quantity of lubricant also plays a role.

In that case the lubricant film thickness in the contact areas may become so small that the surfaces, or surface asperities, of the rolling elements and the rings will touch. As a consequence, the life of the bearing is reduced by adhesive wear or surface distress.

The reduction of film thickness can also lead to a reduction of life caused by contamination. Larger particles can no longer freely pass the contact but will cause dents which may reduce bearing life again.

SUMMARY

Starved lubrication conditions may result from several reasons. For instance, the amount of lubricant in the bearing may simply be too small. Starved lubrication conditions may also occur due to a lack of proper re-flow. A roller over-rolling a running track in a bearing causes the lubricant to partially flow out of the running track. If the speed of the following roller is large, or the viscosity of the lubricant is high, there is no time for the lubricant to flow back into the running track. The remaining amount of lubricant for this roller is then too small, which means that this roller cannot form a film of the required thickness.

This problem is even aggravated in grease lubricated bearings, in which the grease is pushed to the sides of the running track and only a small amount remains or flows inside the running track.

The object of the invention is to provide a solution to this problem in such a way that, even under starved lubrication conditions, the bearing still may have an acceptable life. This object is achieved by means of a rolling element bearing, comprising an inner ring and an outer ring which are each provided with a raceway, and a series of rolling elements which are in contact with the raceways of each ring, a lubricant film being provided in the contacts between the rolling elements and the raceways, said lubricant film at the inlet side of each contact forming a lubricant meniscus, said lubricant meniscus being defined as the transition from the non-lubricated phase to the lubricant phase, wherein starved lubrication conditions prevail, the surface of said each rolling element having minute recesses filled with a lubricant quantity, said recesses being flattened in the contact area defined by the contact between the rolling elements and the ring and thereby releasing lubricant at the inlet side of each contact resulting in a displacement of the meniscus further away from said contact, said meniscus displacement resulting in an increased lubricant film thickness, in each contact area.

Due to the increased film thickness in the contact areas, the risk of metal-to-metal contacts decreases and the life of the bearing increases.

It is observed that rolling element bearings having balls within minute recesses are known per se. However, it was not recognized that such rolling element bearings do behave better under starved lubrication conditions. According to the invention therefore, a rolling element bearing is provided having minute surface recesses in combination with starved lubrication conditions, that is a lubrication film thickness which usually, in the case of non-recessed surfaces, would be too small to separate the contact surfaces fully.

As indicated, in the case of starved lubrication conditions too little lubricant may be available in the contacts between the rings and the rolling elements for obtaining an adequate separation of the surfaces thereof. Such starved lubrication conditions can be defined by using the pressure gradient at the position of the meniscus. In case sufficient lubricant is available, a fully flooded contact is obtained, which is characterized by a zero pressure gradient at the starting point of the pressure build-up. In the case of starved lubrication conditions however, this pressure gradient is non-zero. Insufficient lubricant is available to obtain a meniscus located the required distance from the contact. The lubricant content defined between the meniscus and the adjoining surfaces of the rolling elements and the ring is not sufficient to obtain adequate separation thereof at the location of the contact.

Another way to define starvation is considering the filled fraction content which is defined as the ratio of lubricant film thickness and the gap. The meniscus is then defined as the point where the film thickness deviates from the gap. When this point is close to the Hertzian contact then the contact is referred to as starved.

According to the invention however, this oil content is supplied by minute additional amounts of oil emanating from the surface recesses which are flattened somewhat under load at the contact. These minute amounts then move the meniscus away from the contact as addressed before, which results in a better separation of the contact surfaces under starved conditions.

The recesses can have any suitable shape, and can be arranged according to any suitable pattern.

As explained before, the improved lubrication effect under starved lubrication conditions is obtained in case the recesses contain an amount of lubricant. In order to promote the availability of lubricant within the recesses, preferably the surface energy of the recesses is different from the surface energy of the regions surrounding the pits.

As an example, the surface of the rolling elements is coated and the recesses are uncoated.

In particular, the coating is a diamond like carbon coating, and the pits comprise steel material.

BRIEF DESCRIPTION OF THE DRAWINGS

The invention will now be described further with reference to the graphs shown in FIGS. 1 up to 5.

DETAILED DESCRIPTION OF EMBODIMENTS

In the figures, H denotes the gap between the contacting surfaces. In case of fully flooded conditions this corresponds to the film thickness. In case of starved condition this corresponds to the film thickness in the pressurised region.

Figure 1:
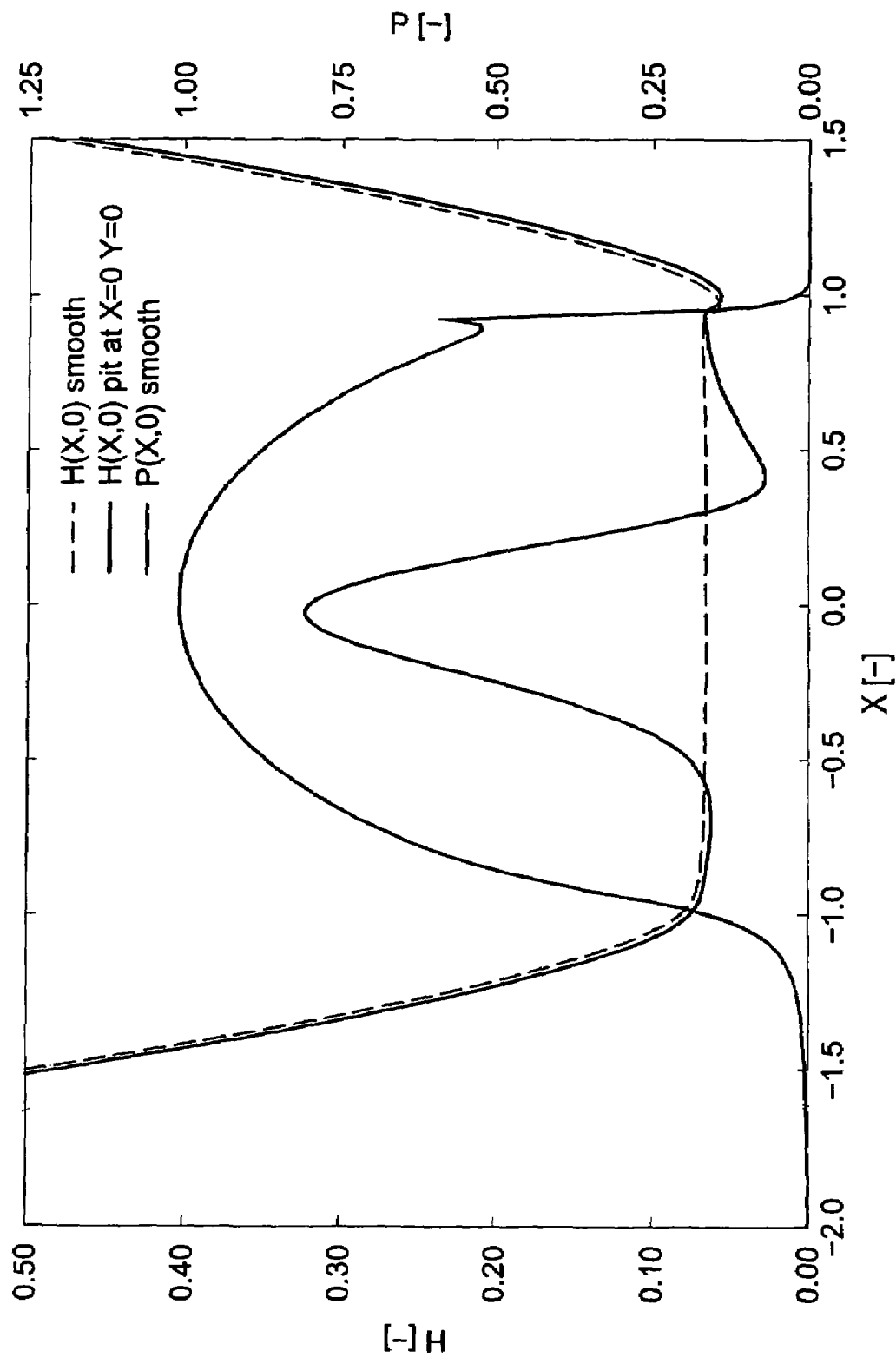
FIG. 1 shows schematically the film thickness and pressure in a single contact under sufficient lubricant conditions, in a cross-section perpendicular to the axis of a bearing.

In the normalised graph of FIG. 1, the dashed line is related to the lubricant film thickness in the contact between a rolling element and the raceway for a non-recessed rolling element. At the contact, the real thickness of the lubricant layer amounts to about 0.14 micrometer.

The fully drawn line represents the film thickness in the case of a rolling element having a recess traveling through the contact where a snap shot is taken at the pit position X+0. As will be clear, the thickness of the lubricant layer inside of the contact is hardly influenced by the presence of the pit.

Figure 2:
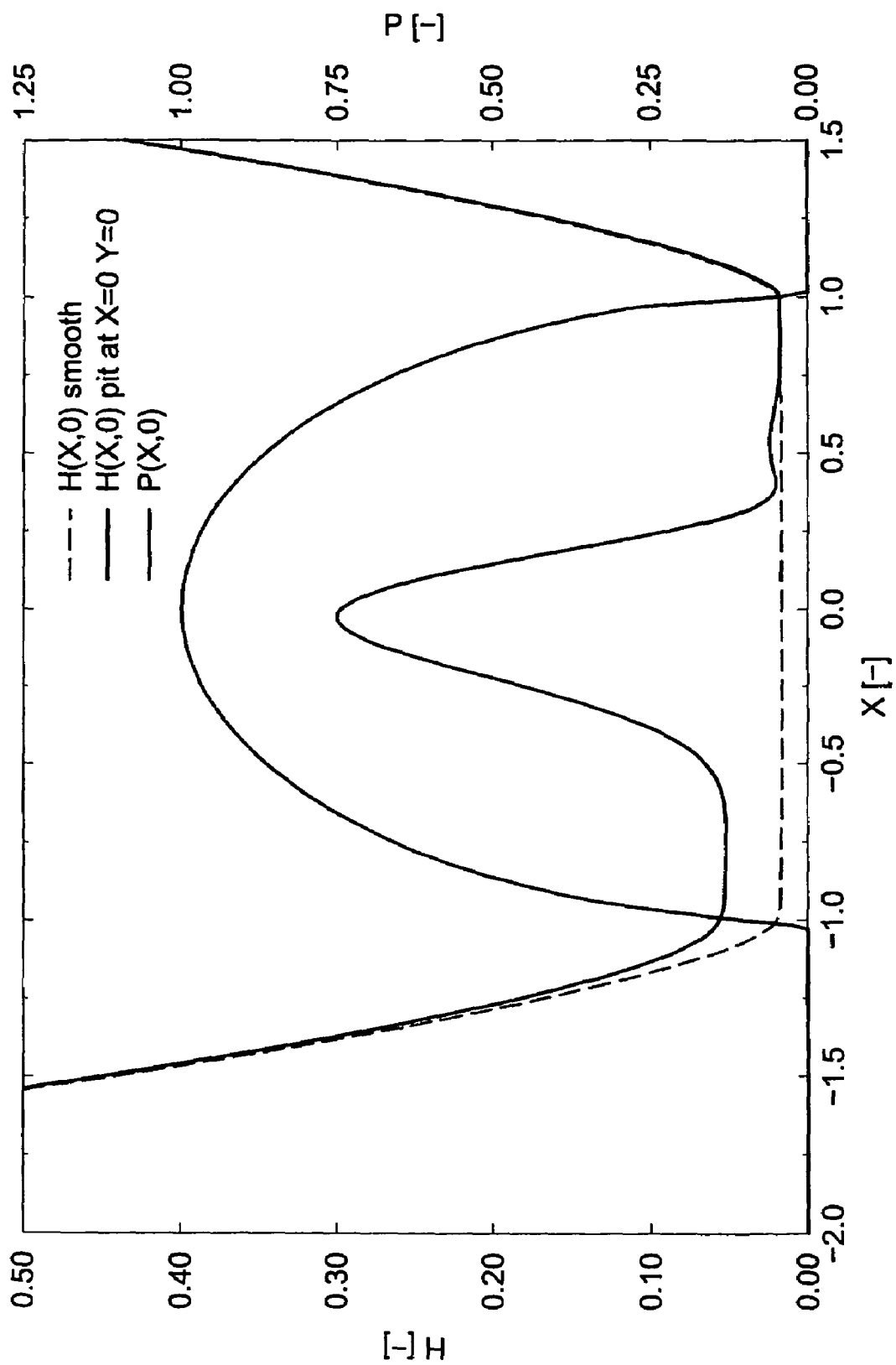
FIG. 2 shows this film thickness and pressure under starved lubrication conditions.

The results of FIG. 2 show that in the case of starved lubrication conditions the thickness of the lubricant layer at the contact is drastically decreased. For a non-recessed rolling element, the thickness is about 0.036 micrometer, which usually is too small to fully separate the surfaces of the rolling element and the raceway from each other. Thus, the surface asperities touch each other, leading to a reduced bearing life.

In the case of a recessed rolling element bearing, the thickness of the lubricant layer of the contact is however considerably larger, despite the generally starved lubrication conditions of the bearing as a whole. The fully drawn line, related to a rolling element bearing with a pit at the position X=0, at the inlet side of the contact amounts to about 0.06 micrometer. This favourable effect is caused by the delivery of oil from the pit into the oil content which is present in front of the rolling element or, in other words, upstream thereof. This oil content is delimited by the surfaces of the rolling element, the raceway and a meniscus.

Figure 3:
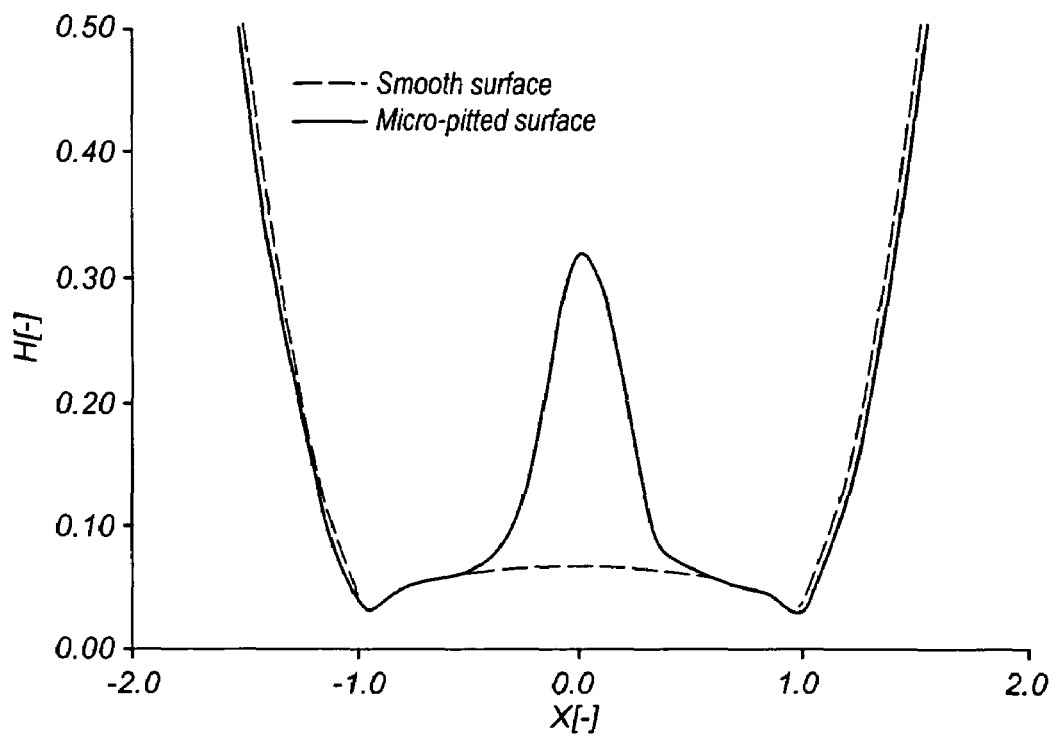
FIG. 3 shows an aggregation of FIGS. 1 and 2.

In FIG. 3, a direct comparison is made between the differences between a recessed and non-recessed rolling element at the location of the contact, for fully flooded and starved lubrication conditions.

Figure 4:
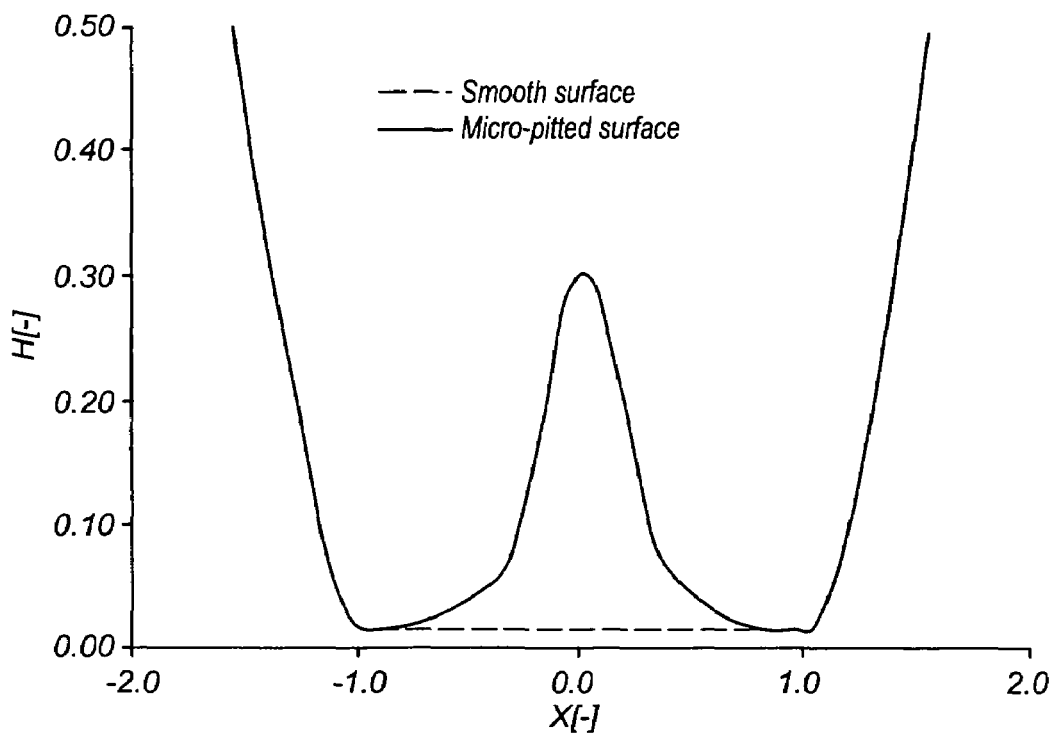
FIG. 4 shows the film thickness for sufficient lubricant conditions, in a cross-section perpendicular to the raceway.
Figure 5:
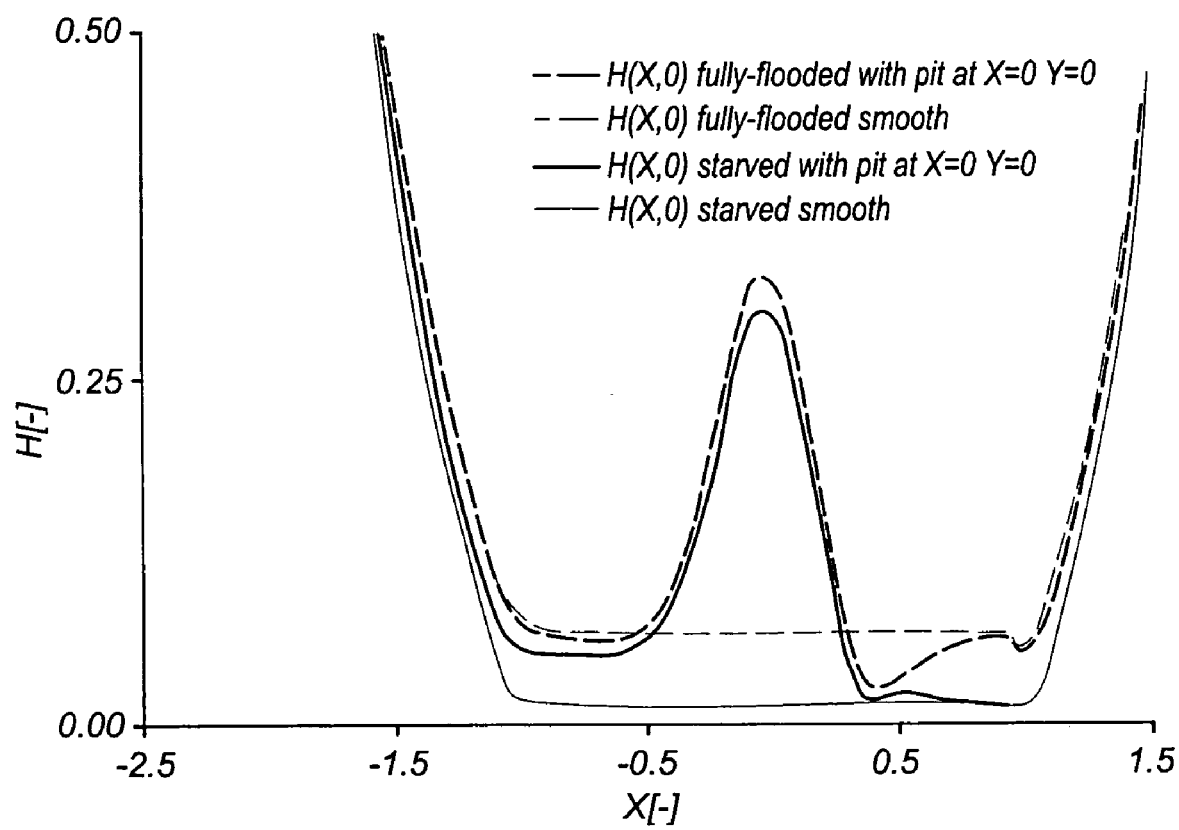
FIG. 5 shows this film thickness for starved lubrication conditions.

FIGS. 4 and 5 show the film thickness in a cross section perpendicular to the raceway fro fully flooded conditions and for starved lubrication conditions.

As will be clear from FIGS. 1 and 4, the presence of a recess at the position Y=0 in the fully flooded case does not make much difference, except at the position of the recess itself.

As is clear from FIG. 2, the upstream film thickness in the starved case is better in the case of a recessed rolling element surface compared to a smooth rolling element surface.

What is claimed is:

1. Method for operating a rolling element bearing under starved lubrication conditions, said rolling element bearing comprising an inner ring and an outer ring which are each provided with a raceway, and a series of rolling elements which are in contact with the raceways of each ring, the surface of each rolling element having minute recesses, said method comprising the steps of:
   subjecting a rolling element to starved lubrication conditions;
   providing a lubricant film in the contacts between the rolling elements and the raceways;
   filling the recesses with a lubricant quantity;
   forming a lubricant meniscus at the inlet side of said contacts;
   making the lubricant meniscus form a non-zero pressure gradient with respect to the surface of the raceway;
   flattening said recesses in the contacts by making said rolling elements and rings overroll each other;
   releasing lubricant at the inlet side of said contacts as a result of said overrolling;
   displacing the meniscus further away from said contacts as a result of releasing the lubricant; and
   obtaining an increased lubricant film thickness in said contacts as a result of said meniscus displacement.

2. Method according to claim 1, comprising the step of obtaining a lubricant film thickness of at least 0.01 micrometer at the middle of the contact by displacing the lubricant meniscus further way from the contact.

3. Method according to claim 1, comprising the step of providing recesses with an arbitrary shape on the rolling elements.

4. Method according to claim 1, comprising the step of providing transversely grooved recesses on the rolling elements.

5. Method according to claim 1, comprising the step of forming an isotropic surface pattern on the rolling elements.

6. Method according to claim 1, comprising the step of forming an anisotropic surface pattern on the rolling elements.

7. Method according to claim 1, comprising the step of applying a layer of lubricant on each rolling element or ring by means of surface tension.

8. Method according to claim 1, comprising the step of providing recesses having a surface energy which is different from the surface energy of the regions surrounding said recesses.

9. Method according to claim 1, comprising the step of coating the surface of the recesses.

10. Method according to claim 1, comprising the step of coating the surface of the rolling elements outside the recesses.

11. Method according to claim 1, comprising the step of coating the surface of the rolling elements outside the recesses with a diamond like carbon coating.

* * * * *